F. E. RUSSELL.
CAMERA.
APPLICATION FILED DEC. 12, 1918.
1,309,747.
Patented July 15, 1919.
2 SHEETS—SHEET 1.
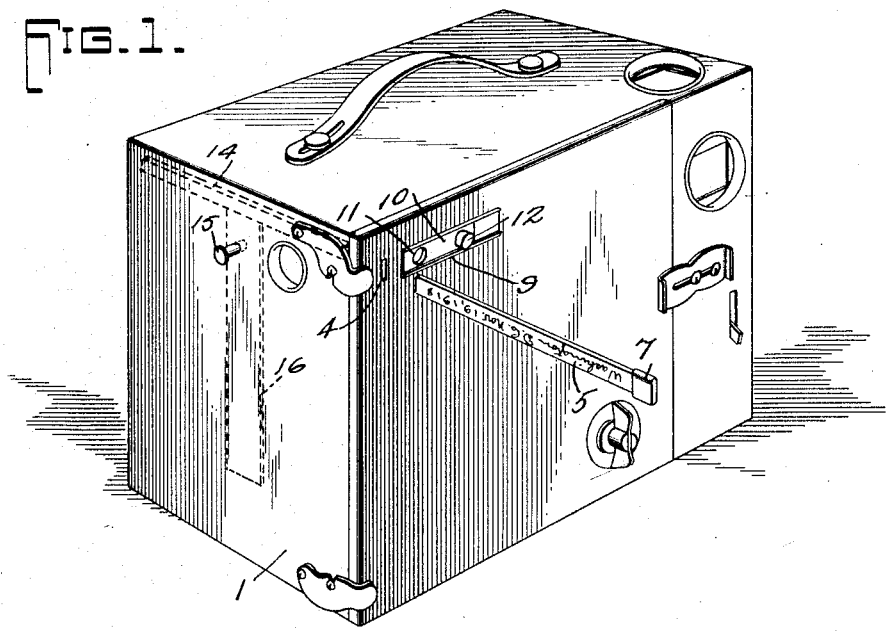
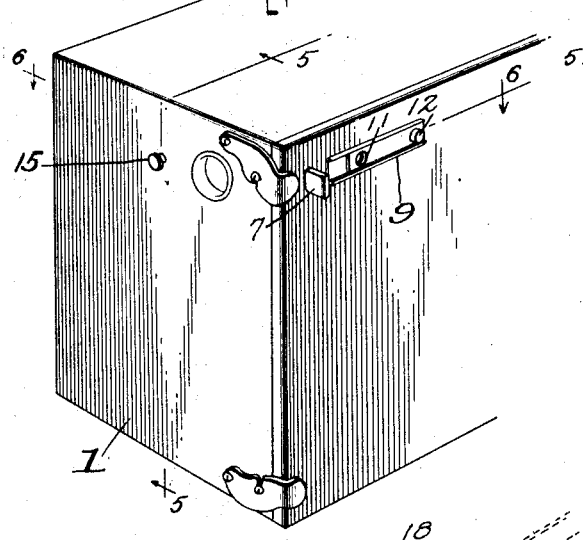
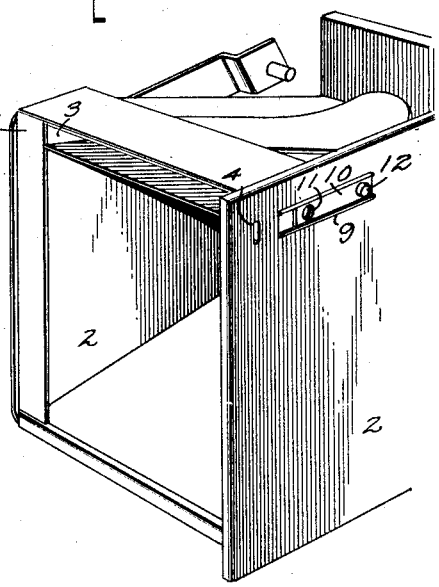
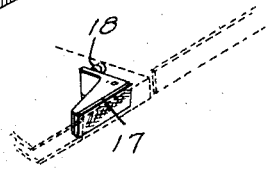
INVENTOR
FRANK E. RUSSELL,
BY
ATTORNEYS F. E. RUSSELL.
CAMERA.
APPLICATION FILED DEC. 12, 1918.
1,309,747.
Patented July 15, 1919.
2 SHEETS—SHEET 2.
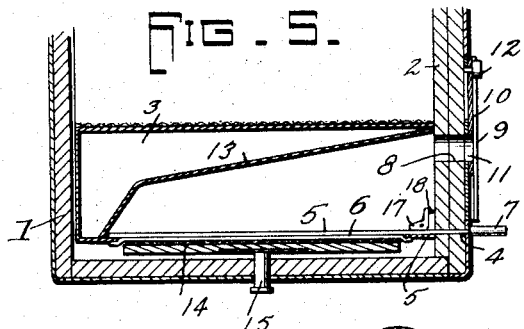
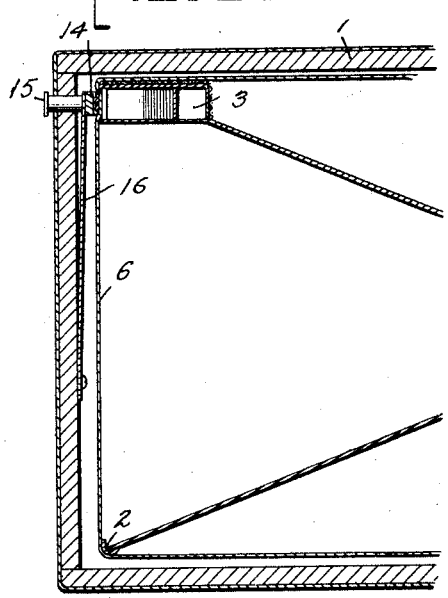
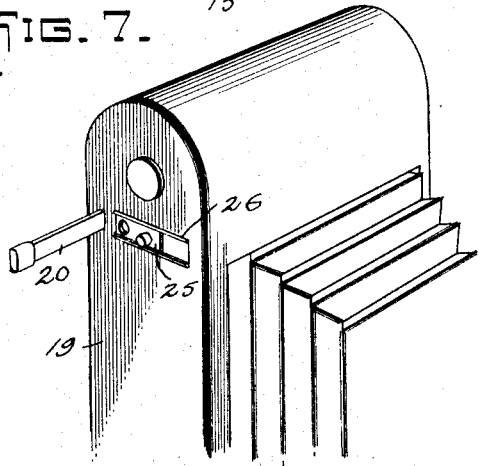
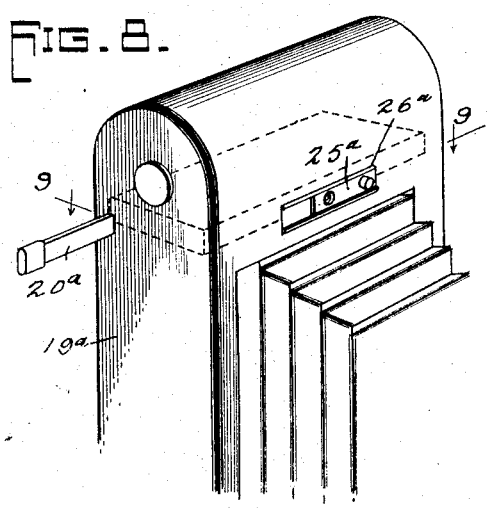
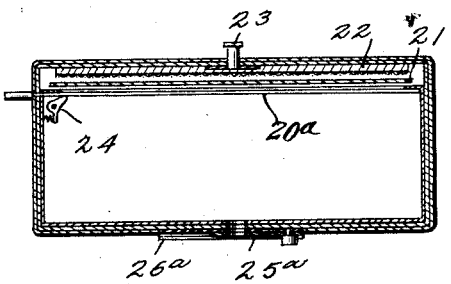
INVENTOR
FRANK E. RUSSELL,
BY
ATTORNEYS

UNITED STATES PATENT OFFICE.

FRANK EDWARD RUSSELL, OF BATAVIA, NEW YORK.

CAMERA.

1,309,747.  Specification of Letters Patent.  Patented July 15, 1919.

Application filed December 12, 1918. Serial No. 266,459.

*To all whom it may concern:*

Be it known that I, FRANK E. RUSSELL, a citizen of the United States, and a resident of Batavia, in the county of Genesee and State of New York, have invented certain new and useful Improvements in Cameras, of which the following is a specification.

My invention is an improvement in cameras, and has for its object to provide mechanism in connection with cameras of every character for permitting data concerning any exposure to be printed upon the film, wherein means is provided for receiving such data, and for permitting the said means to be placed in position to print upon the film, and wherein other means is provided for admitting light to the said means and the portion of the film engaged thereby to print the same.

In the drawings:

Figure 1 is a perspective view of a box camera provided with the improvement, and with the parts in one position;

Fig. 2 is a similar view of a part of the camera, with the parts in another position;

Fig. 3 is a perspective view of a portion of the frame;

Fig. 4 is a perspective view of the mechanism for closing the slot;

Figs. 5 and 6 are sections on the lines 5—5 and 6—6, respectively, of Fig. 2;

Fig. 7 is a perspective view of one end of a folding camera;

Fig. 8 is a similar view of a modified construction;

Fig. 9 is a section on the line 9—9 of Fig. 8.

In the embodiment of the invention shown in Figs. 1 to 6, the camera 1 has the usual frame 2 inside the same, over the end of which the film passes, and at the top of the said frame there is provided a chamber 3 which is cut off from the body of the interior of the camera, as shown more particularly in Fig. 6. At one end of this chamber the frame and camera wall have registering slots 4 through which the strip 5 of celluloid or like material, shown more especially in Fig. 1, may be inserted adjacent to the film indicated at 6.

The film, as shown in Fig. 6, passes over the rear open end of the chamber, and the slots 4 are so arranged that the strip 5 will be inserted at such a point that it will cover the rear end of the chamber outside of the film. This strip has a handle 7, and the strip is adapted to receive thereupon data in regard to the picture, as, for instance, the place of exposure and the date, the said data being placed upon the strip by means of a lead pencil or the like so that it may be erased to receive other impressions.

At that end of the chamber adjacent to the slots 4 there is provided a light opening 8 which extends through the frame of the camera wall, and a guide 9 is arranged adjacent to the opening, the guide carrying a slide 10 which has an opening 11 adapted to register with the opening 8 or to be out of register therewith, depending upon the position of the slide. The slide also has a handle 12 for convenience in manipulating the same, and it will be obvious that the opening 8 may be entirely uncovered, partially uncovered or closed, as may be desired, to admit light to the chamber 3.

A reflector 13 is arranged within the chamber, the said reflector being so arranged that the light admitted to the openings 8—11 will be reflected on to the film 3 through the strip 5. Means is also provided for pressing the strip into tight contact with the film. The said means comprises a bar 14 which has a facing of felt or the like adjacent to the film, and this bar has a handle portion 15 which extends outwardly through an opening in the camera wall, the handle permitting the bar to be moved toward or from the film.

A plate spring 16 is secured to the camera wall below the handle 15, and this spring normally presses the bar away from the film.

In the operation of the above embodiment, the data referring to the exposure are written or otherwise impressed upon the strip 5. The strip is now inserted through the slots 4 between the chamber and the film. By means of the handle 15 the bar 14 is pressed against the film, to hold the said film firmly against the strip, and the slide 10 is moved to admit sufficient light to the chamber 3 to make the impression.

After a sufficient exposure, the slide is closed, and the strip is removed. When the film is developed, there will be printed upon the same the data on the strip. Means is provided for excluding light at the slot 4. The said means is an angle plate 17, shown more particularly in Fig. 4. This angle plate has on the outer face of one portion a facing of felt or the like, and a coil spring 18 coöperates with the other arm to normally hold the plate with the felt facing over the opening. When the strip is inserted through the slot 4, the angle plate is turned into the position of Fig. 5. As soon as the strip is withdrawn the plate takes a position over the opening, closing the same, and excluding light therefrom.

In the embodiment of the invention shown in Figs. 7, 8 and 9, the cameras 19 and 19$^a$, respectively, have the chamber at the top of the camera, the said chamber being indicated in dotted lines in Fig. 8, and the opening for the strips 20—20$^a$, respectively, correspond to the opening 4 of Fig. 1. Through the slot the strip 20 or 20$^a$, as the case may be, may be introduced at the rear of the chamber which corresponds to the chamber 3 of Fig. 1. The film, indicated at 21 in Fig. 9, passes over the rear open end of this chamber, and the strip 20 or 20$^a$, as the case may be, is just in front of the film. The bar 22 which corresponds to the bar 14 of Fig. 1 is operated by a handle 23, and is normally pressed away from the film by a spring similar to that shown in Fig. 6.

The light excluder 24 is similar in all respects to the excluder 17 of Fig. 4. The slide 25 and 25$^a$, respectively, corresponding to the slide 10 of Fig. 1, is arranged within a guide 26 and 26$^a$, respectively, and the camera and the slide have registering openings for admitting light. As shown in Fig. 7, this light admitting slide is arranged on one side wall, while in Fig. 8 it is arranged on the front wall. In the Fig. 7 arrangement a reflector like that shown in Fig. 5 might be used. In Fig. 8 no reflector is needed.

I claim:

1. In a camera, a chamber supported near one end thereof and having its rear end open and adjacent to the film when the film is in exposed position, said chamber also being open at one end and abutting the camera wall at the said open end, the camera having an opening at the said open end of the chamber, means for closing the camera opening, said camera and chamber having registering openings at the said end and near the film when the film is in exposed position, and a strip of translucent material adapted to enter the registering openings and to extend between the chamber and the film, and means for pressing the film toward the strip, said means comprising a bar arranged within the camera in a position to register with the strip when the strip is in place, and a spring supporting the said bar, the bar having operating means extending through the camera wall.

2. In a camera, a chamber supported near one end thereof and having its rear end open and adjacent to the film when the film is in exposed position, said chamber also being open at one end and abutting the camera wall at the said open end, the camera having an opening at the said open end of the chamber, means for closing the camera opening, said camera and chamber having registering openings at the said end and near the film when the film is in exposed position, a strip of translucent material adapted to enter the registering openings and to extend between the chamber and the film, and means for pressing the film toward the strip.

FRANK EDWARD RUSSELL.

Copies of this patent may be obtained for five cents each, by addressing the "Commissioner of Patents, Washington, D. C."